BALANCED SIGNAL MIXERS AND POWER DIVIDING CIRCUITS

Filed Dec. 28, 1966 2 Sheets-Sheet 1

INVENTOR
E. W. ASLAKSEN
BY Roy M. Porter Jr.
ATTORNEY

Nov. 4, 1969 E. W. ASLAKSEN 3,477,028

BALANCED SIGNAL MIXERS AND POWER DIVIDING CIRCUITS

Filed Dec. 28, 1966 2 Sheets-Sheet 2

United States Patent Office 3,477,028
Patented Nov. 4, 1969

3,477,028

BALANCED SIGNAL MIXERS AND POWER DIVIDING CIRCUITS

Erik W. Aslaksen, Allentown, Pa., assignor to Bell Telephone Laboratories, Incorporated, Murray Hill and Berkeley Heights, N.J., a corporation of New York Filed Dec. 28, 1966, Ser. No. 605,337
Int. Cl. H04b *1/26*
U.S. Cl. 325—446 13 Claims

ABSTRACT OF THE DISCLOSURE

In a microwave network for dividing signal energy, circulator means are joined to form a common arm, a reactance being included either in shunt or in series in the common arm. By varying the magnitude of the reactance and its phase location between the circulators, power division in arbitrary phase and amplitude are obtained.

This invention relates to branched microwave circuits, and more particularly, to balanced signal mixers and to microwave power dividing circuits particularly adapted for use in balanced mixers.

Waveguide or coaxial line directional couplers and hybrid junctions are familiar forms of microwave power dividing networks and as such have been used extensively for the nucleus of balanced signal mixers and modulators. While these components are stable and dependable, they are physically cumbersome, expensive to fabricate and are usually incapable of adjustment. Further they are not easily integrated with the strip line and printed circuit forms of high frequency wave transmission line now being extensively used. On the other hand, the microwave circulator has been developed to the point where its strip line construction is simple and inexpensive and is generally considered the preferred circulator form.

It is therefore an object of the invention to divide microwave power in a given phase and amplitude relationship.

It is a more specific object to divide and combine microwave power in the amplitude and phase required in balanced modulators.

It is a further object to duplicate with strip line circulators, the properties of hybrid junctions and directional couplers.

In accordance with the present invention a pair of circulators are joined to form a common arm and a reactance, preferably capacitive, is included either in shunt or in series in the common arm to produce a power dividing network having properties not previously recognized. By varying the magnitude of the reactance and its phase location between the circulators, power divisions in arbitrary phase and amplitude are obtained including those particular divisions characteristic of hybrids and directional couplers. By terminating specific arms of this network in microwave detectors and by combining the outputs of these detectors in specifically phased connections, all of the various possibilities of modulator product discrimination fund in prior art balanced modulators can be duplicated.

According to a particular embodiment of the invention the configuration takes the form of two strip line circulators arranged with a common ground plane and with a pair of mutually aligned arms. When the aligned arms are separated by a nonconductive gap, the series capacitive coupling between them is varied by a simple conductive member insulated from the ground planes and adjustably suspended near the gap. When the aligned arms are conductively connected, an adjustable shunt capacity is introduced to them by a simple conductive member conductively connected to the ground planes and adjustably suspended near the connected arms. In either its series or shunt form, the particular structure has the unexpected property that the value of the capacity changes with frequency in such a way that the ratio of reflection to transmission produced at the reactance remains substantially constant with frequency over a band at least as great as the equivalent of usual hybrids or directional couplers.

These and other objects and features, the nature of the present invention and its various advantages, will appear more fully upon consideration of the specific illustrative embodiments shown in the accompanying drawings and described in detail in the following explanation of these drawings, in which:

FIG. 1 schematically illustrates both a balanced microwave mixer in accordance with the invention and that of the power divider upon which the modulator is formed;

Figures 1, 1A:
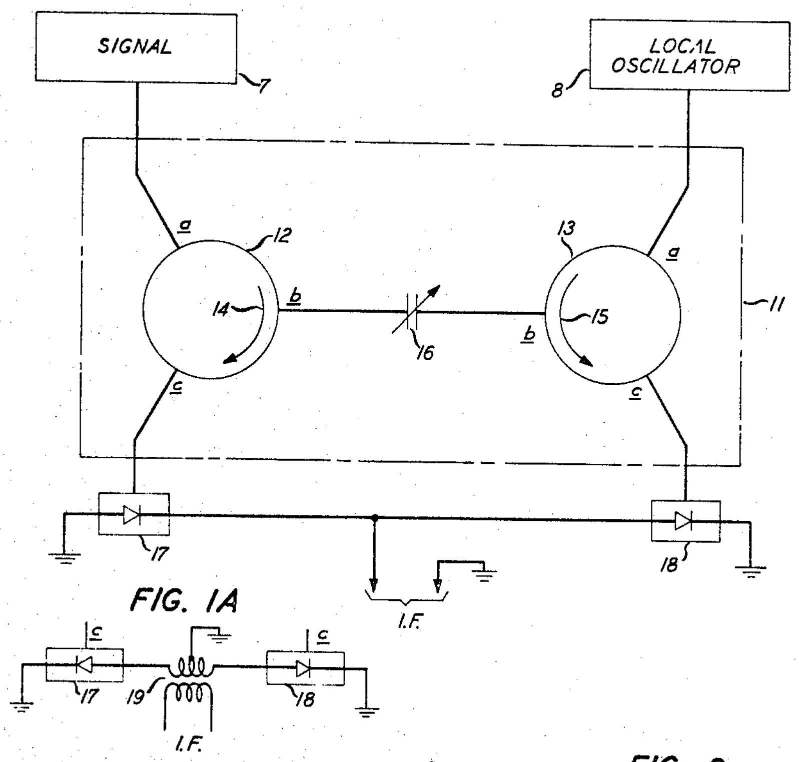
FIG. 1A illustrates an alternative connection for the microwave detectors of FIG. 1.
Figures 2, 2A:
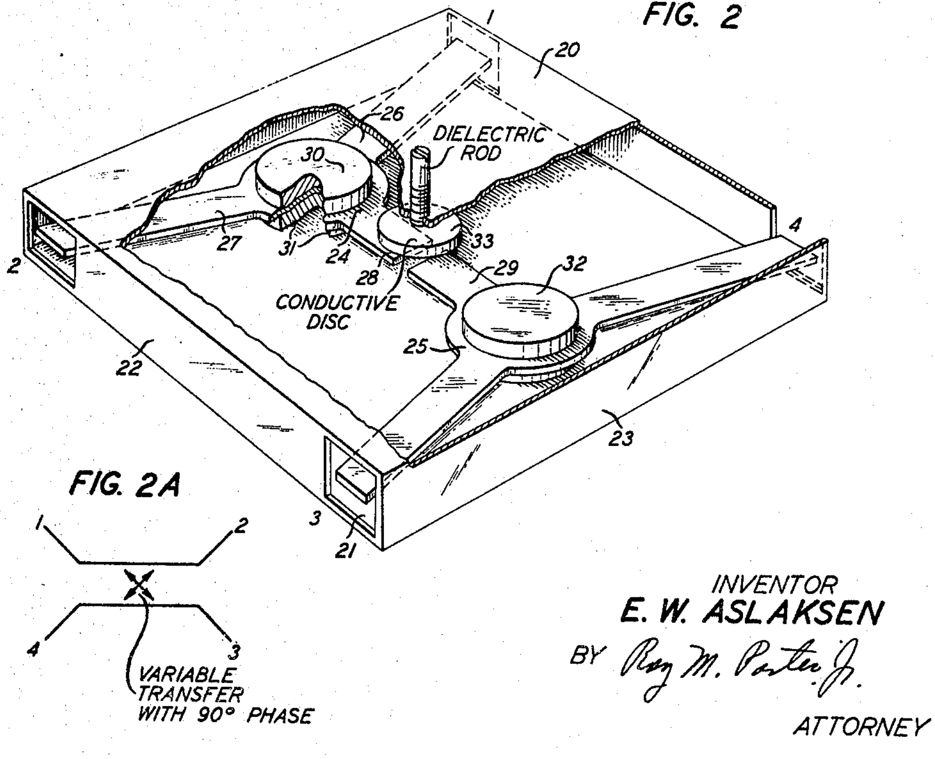
FIG. 2 is a perspective of a series capacity strip line power divider in accordance with the invention.
Figure 3:
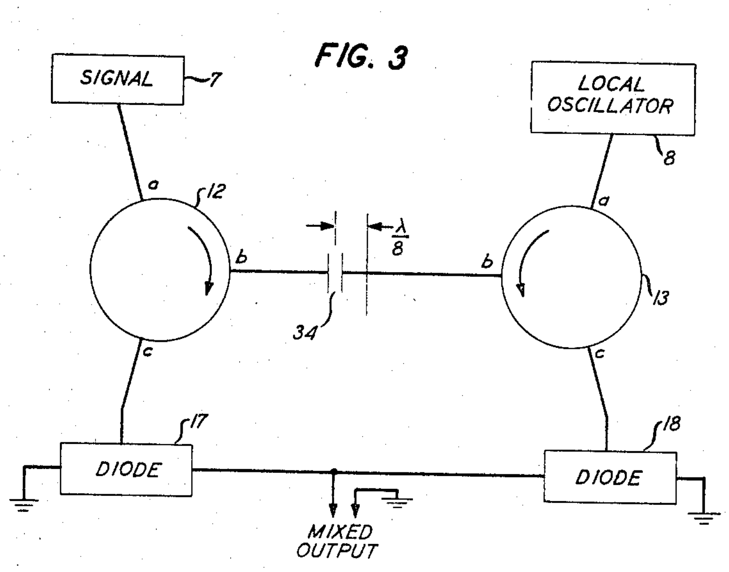
Figure 4:
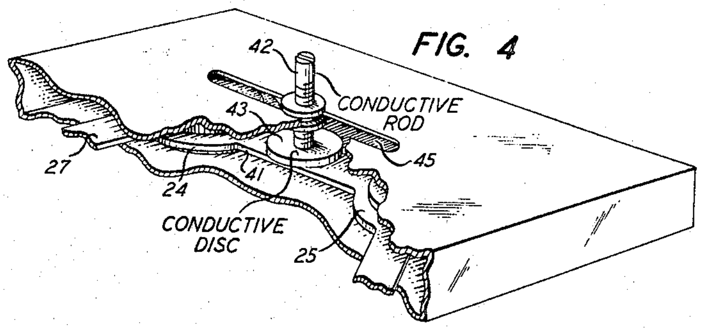
Figure 5:
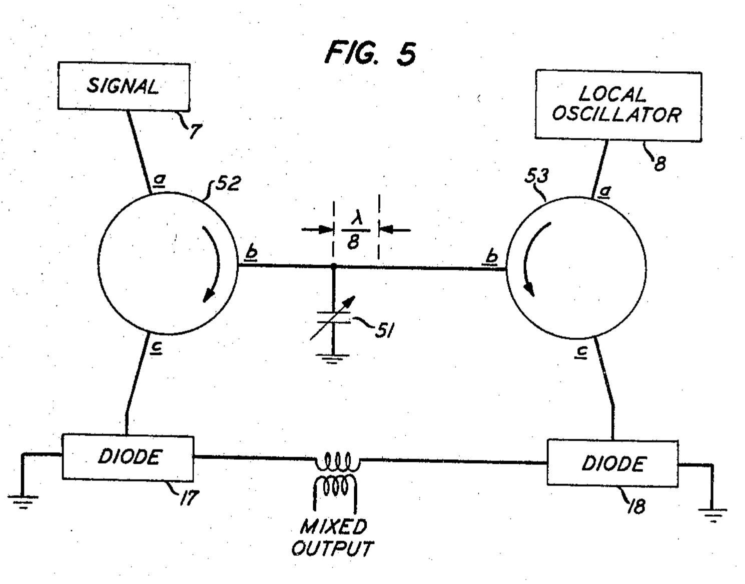

FIG. 2A diagrams the coupling characteristic of the divider of FIG. 2;

FIG. 3 is a schematic illustrating a modification of the modulator and power divider of FIG. 1;

FIG. 4 is a perspective view of a shunt capacity strip line power divider in accordance with the invention; and FIG. 5 schematically illustrates a balanced mixer which can be formed from the divider of FIG. 4.

Referring more particularly to FIG. 1, the mixing function selected to illustrate the modulator in accordance with the invention is that of combining a microwave signal from source 7 with a local oscillator signal from source 8 to produce a difference signal at a lower intermediate frequency (IF). It should be understood, however, that signal mixing functions for other applications may also be facilitated by the invention.

The heart of the mixing circuit comprises the microwave power divider enclosed within box 11, structural details of which will be considered hereinafter in connection with FIG. 2. Schematically, power divider 11 comprises first and second microwave circulators 12 and 13 each having at least three arms *a*, *b*, and *c*, and a sequential transmission of energy between the arms as illustrated by the curved arrows 14 and 15 respectively. Suitable circulators in a number of forms are well known in the art and any of these forms may be used to practice the broad principles of the invention. Particularly adapted strip line forms are disclosed for example in text books such as Microwave Ferrites and Ferrimagnetics by Lax and Button, 1962, pp. 517 and 609; in publications such as Fay and Comstock "Operation of the Ferrite Junction Circulator," 13 IEEE Transactions MTT pages 15 through 27, January 1965; in patents such as Davis 3,065,024, Nov. 6, 1962 or in the copending application of D. F. Linn, Ser. No. 479,439, filed Aug. 13, 1965.

Specifically, circulators 12 and 13 are polarized so that the transmission of power between the arms is in opposite sequences, that is, clockwise for circulator 12 and counterclockwise for circulator 13. The *b* arm of circulator 12 is connected by a variable capacitive coupling 16 to the *b* arm of circulator 13. This capacitive coupling is represented schematically only, and it is sufficient for the present explanation to understand that the capacitive coupling is located midway between circulators 12 and 13 and has a value to be defined in detail hereinafter for which one half the power incident from upon arm *b* of one circulator is reflected as from an impedance discontinuity while the remaining one half the power is coupled capacitively to arm *b* of the other circulator. Further details of a specific and novel structure having this characteristic will be considered in connection with FIG. 2.

Arm *a* of circulator 12 is connected to signal source 7 and arm *a* of circulator 13 is connected to local oscillator 8. The remaining *c* arms of each were terminated in microwave diode detectors 17 and 18, which in the embodiment illustrated, are connected in parallel in oppositely poled relation, i.e., the anode of one and the cathode of the other are connected in common to one side of the IF output circuit while the remaining diode terminals and the other side of the IF are grounded. Suitable circuits for supplying the diodes with a direct current bias, if required, are standard in the art and are not shown.

In operation, signal power from source 7 applied to arm *a* of circulator 12 appears at arm *b* thereof. One half of this power is transmitted to arm *b* of circulator 13 by condenser 16 to appear at arm *c* of circulator 13 and the other half is reflected to appear at arm *c* of circulator 12 with a phase difference between transmitted and reflected components of 90 degrees. Local oscillator power from source 8 is similarly divided between arm *c* of circulator 12 and arm *c* of circulator 13, also with a 90-degree phase difference. Using the reflected energy in each arm *c* as the phase reference (signal in arm *c* of circulator 12 and local oscillator in arm *c* of circulator 13), the other signal components in each arm have a phase 90 degrees from the reference phase. Therefore the difference modulation products as generated in diodes 17 and 18, respectively, are out-of-phase with respect to each other and the sum products are in phase. Since in the particular application selected for illustration, the IF frequency is the difference product, oppositely poled diodes connected in parallel cause the IF frequency to combine in phase in the output while the image or sum frequency is cancelled. Rectified components at the signal and local oscillator frequencies can be removed by filters in the IF.

Connecting diodes 17 and 18 in like poled, parallel relation causes the sum modulation product to add in phase while the difference product cancels in the output as would be required in an up-converter, for example.

A push-pull connection of diodes 17 and 18 to the output can be made with the use of an IF push-pull transformer 19 as shown in FIG. 1A. In this arrangement like poled diodes produce an in-phase combination of the difference product in the IF output and oppositely poled diodes produce an in-phase combination of the sum product.

It should be noted that in any of the foregoing connections, reflections of any energy from the diodes appear exclusively in arm *a* of the circulator to which that diode is connected. Since this energy is traveling toward sources 7 and 8, it may be monitored to provide a simple and effective way of tuning the diodes and/or the energy may be absorbed by isolators included as part of the signal sources.

Having thus described a signal mixer in accordance with one aspect of the invention, attention may now be directed to features of the subcombination comprising the power divider within box 11 which makes this mixture possible. Thus FIG. 2 shows perspective details of components according to one embodiment as found in box 11 of FIG. 1. In accordance with the invention this particular embodiment utilizes the form of waveguide known as "strip line" and therefore includes a pair of flat electrically conductive ground plane members 20 and 21 extending parallel to and spaced apart from each other. Conductive side walls such as 22 and 23 connect and support ground planes 20 and 21 and while illustrated as forming a rectangular cavity, can form an enclosure of arbitrary size and shape. Centrally spaced between and parallel to ground plane members 20 and 21 is a center conductor or spider member 24 of a first circulator. This spider member includes a common portion and three strips, such as 26, 27 and 28, symmetrically extending away from the common portion. Two of these strips 26 and 27 extend to openings in the side walls and constitute input and/or outputs of the first circulator to which other strip lines, coaxial components, waveguides or loads may be connected by way of transition members conventional in the art. Discs 30 and 31 of magnetically polarized gyromagnetic material, such as yttrium garnet or ferrite, are located above or below or on both sides of the common portion of spider 24 to complete the first circulator in accordance with the usual construction of Y-junction circulators as described in the foregoing publications. Discs 30 and 31 are then permanently magnetically polarized or are polarized by the use of external magnets. A similar combination of a spider 25 and magnetically polarized gyromagnetic discs such as 32 completes the second circulator.

Strip 28 of spider 24 extends almost to the center of the enclosure where it is abruptly truncated. The three strips comprising spider 25 of the second circulator are arranged as a mirror image of spider 24 with strip 29 aligned with, truncated adjacent to, and spaced from the end of strip 28. Directly above the adjacent spaced ends of strips 28 and 29 is a thin disc 33 of conductive material suspended on the end of a threaded rod of insulating dielectric material extending from wall 20 so that disc 33 may be adjusted in position between ground plane 20 and strips 28 and 29.

In particular, if the strip transmission line on either side of the gap has an impedance $Z_0$, it is desired that the gap together with disc 33 have a capacity $$C=1/\omega X Z_0 \quad (1)$$

where $\omega$ is the midband angular frequency and X represents the required ratio of the reflected voltage $V_R$ to the transmitted voltage $V_T$ according to the relation $$V_R/V_T=-jX \quad (2)$$

This shows that the phase difference between the reflected transmitted waves is theoretically 90 degrees and is independent of the splitting ratio. The splitting ratio on the other hand depends upon the gap capacity and the impedance of the line according to Equation 1. In a specific embodiment which was found acceptable in practice, relative dimensions include a thickness for disc 33 comparable to the thickness of strips 28 and 29. The strip thickness is in turn in the order of $\frac{1}{30}$ of its width. Disc 33 in addition has a diameter in the order of the strip width. Obviously complete power transfer is obtained when disc 33 is fully inserted to contact strips 28 and 29 and short out the effective capacity. The minimum power transfer depends upon the gap width and it has been observed that a transfer of one half the power occurs when the gap is comparable to the strip thickness corresponding to a value of $C=1/\omega Z_0$. Increasing the gap reduces the transfer.

Taken literally, Equations 1 and 2 would indicate that for a fixed C, X would vary linearly with frequency $\omega$. Experimentally it has been determined, however, that a structure having the general proportions set forth above has a power split that is substantially constant over a 500 megacycle band in the four gigahertz communication band. This is a performance equivalent to that found in typical direction couplers and hybrids for this band. This means that C itself in Equation 1 as applied to a structure in accordance with the invention is not a simple function, but varies with frequency in a way which makes X constant. While no rigorous equivalent circuit has been derived, it can be assumed that the capacity of conductive disc 33 is actually distributed over a discrete area and has fortuitously associated with it such a distributed inductance that together they form a complex constant impedance network.

The power and phase relationships, which may be schematically illustrated as in FIG. 2A, render the power divider in accordance with the invention suitable for much broader application than in the modulator already described. For example, it will be observed that the relationships are similar to those of a directional coupler or a 90-degree phase shift hybrid except that the coupling coefficient or power transfer can be varied. Thus power applied to arm 1 will divide between arms 2 and 3 according to the insertion of disc 33 with a substantially 90-degree differential phase shift, and no power will appear at arm 4. The power divider can therefore be used in all applications in the art in place of the more intricate and nonadjustable directional couplers and hybrids, particularly in strip line configurations, and in addition, can be used to sample or divert into an auxiliary transmission path any desired or variable fraction of the power traveling along a main transmission path.

Modification of the power divider of FIG. 2 to locate disc 33 and the gap between strips 28 and 29 nearer to one circulator than the other has the effect of moving the series capacity introduced thereby and changes the phase shift of energy reflected by the capacity. This is illustrated schematically in FIG. 3 on which reference numerals corresponding to those of FIG. 1 have been used to designate corresponding components. Modification in FIG. 3 will be seen to reside in the fact that variable capacitor 34 is displaced away from the point of electrical symmetry between the circulators toward circulator 12. Specifically moving capacitor 34 a given fraction of a wavelength, subtracts a phase shift of twice this fraction from energy traveling from arm *a* of circulator 12 to arm *c* of circulator 12 and adds the same phase shift to energy traveling from arm *a* of circulator 13 to arm *c* of circulator 13. Thus, moving the capacitor one-eighth wavelength duplicates the phase shift produced by a 180-degree hybrid and at the same time retains a varaible power division ratio. The energy applied to arm *a* of circulator 12 divides out-of-phase in any given ratio between arm *c* of circulator 12 and arm *c* of circulator 13 with none appearing in arm *a* of circulator 13. On the other hand energy applied to arm *a* of circulator 13 divides in phase in any ratio between arms *c* of circulator 13 and arm *c* of circulator 12 with none appearing at arm *a* of circulator 12.

FIG. 3 also serves to illustrate how this phase and power division can be used to produce novel modulator configuration. Thus the rectified outputs of diode detectors 17 and 18 combined to produce the sum and difference products of the signal from source 7 and local oscillator from source 8 similar to that described with reference to FIG. 1. In addition, the unique phase shift of the power divider according to FIG. 3 has the effect of making the separately rectified components of local oscillator 8 combine out-of-phase in the output of opposite poled, parallel connected diodes like those in FIG. 1. To obtain signal cancellation, like poled diodes connected in push-pull as in FIG. 1A can be employed. As is well known in balanced modulators using conventional hybrids, signal or local oscillator cancellation is a substantial advantage in frequency converters where the modulating signals are not substantially different in frequency from the desired product and would be difficut to separate with conventional filters.

FIG. 4 illustrates a modification of the invention of FIG. 2 in which even greater phase variation flexibility is achieved. Modification will be seen to reside in joining adjacent arms of the circulators by a continuous, conductive strip 41 and forming rod 42 that supports disc 43 from ground plane 44 of conductive material. An adjustable position of rod 42 along the length of strip 41 may be obtained, for example, by providing an elongated slot 45 in the ground plane. The remaining components of FIG. 4 are identical to those of FIG. 2.

The embodiment of FIG. 1 was analyzed as a variable capacity C according to Equation 1 serially coupling adjacent circulators. Similarly, the embodiment of FIG. 4 can be analyzed as a variable capacity C according to the Equation 1 shunt at a variable position along the common arm of adjacent circulators. The absolute ratio of power division between arms 2 and 3 defined as $V_R$ and $V_T$, respectively, is then $$V_R/V_T=1/2X \quad (3)$$

and can be controlled as in the embodiment of FIG. 2, but the phase of this division can be varied over a full 360-degree range.

FIG. 5 illustrates a specific and novel modulator configuration made possible by locating the position of a variable shunt capacitor, as schematically represented by 51, one-eight wavelength nearer to circulator 52 than to circulator 53 along their conductively connected *b* arms. Since this capacitor location adds and subtracts a phase shift of 90 degrees as compared with a symmetrical location in the manner described in connection with FIG. 3, components of the signal from source 7 combine out-of-phase in the modulated output of push-pull connected, like poled diodes 17 and 18. Oppositely poled diodes connected in parallel as in FIG. 1 can be employed in FIG. 5 to obtain local oscillator cancellation.

It should be understood that in any of the embodiments herein described, reversing the direction of circulation of either or both of the circulators does not change the basic coupling characteristic but merely re-orders the terminals. It should be further understood that the illustrated gap and/or disc and the shunt or series capacity formed thereby is but one form of reactive impedance discontinuity which can be located at an appropriate point along coupled arms of adjacent circulators. For example, series and shunt inductors are the duals of shunt and series capacitors, and solid state devices such as varactors provide a voltage variable capacity.

In all cases it is to be understood that the above-described arrangements are merely illustrative of a small number of many possible applications of the principles of the invention. Numerous and varied other arrangements in accordance with these principles may readily be devised by those skilled in the art without departing from the spirit and scope of the invention.

What is claimed is:

1. A microwave network for dividing signal energy of angular frequency $\omega$ from a given source simultaneously between first and second loads according to a ratio $V_R/V_T$ where $V_R$ and $V_T$ are the voltages at said first and second loads respectively, said network comprising first and second circulators each having at least three arms of characteristic impedance $Z_0$ and characterized by a successive circulation of power from an arm preceding a given arm to an arm succeeding a given arm, means for forming a common arm between one arm of said first and one arm of said second circulator, said common arm having an associated capacity equal substantially to $1/\omega Z_0 X$ where X is equal absolutely to $V_R/V_T$ when said capacity is serially associated in said common arm and to $V_T/2V_R$ when said capacity is shunt associated in said common arm, said source being connected to an arm of said first circulator preceding said common arm, said first load being connected to an arm of said first circulator succeeding said common arm, and said second load being connected to an arm of said second circulator succeeding said common arm.

2. The network according to claim 1 wherein said common arm includes a series capacity equal to $1/\omega Z_0$ whereby said energy divides equally between said loads.

3. The network according to claim 1 wherein said common arm includes a shunt capacity equal to $2/\omega Z_0$ whereby said energy divides equally between said loads.

4. The network according to claim 1 including a second source of energy connected to the arm of said second circulator preceding said common arm, wherein said loads are microwave detectors, and including means for combining the outputs of said detectors.

5. A microwave network for dividing signal energy from a given source simultaneously between first and second loads according to a given ratio, said network comprising first and second circulators each having at least a ground plane member and a center conductor member forming three arms of a given characteristic impedance and characterized by a successive circulation of power from an arm preceding a given arm to an arm succeeding a given arm, the center conductor of one arm of each circulator being aligned to form a common arm between said first and said second circulators, said common arm having an associated lumped reactance of such value relative to said characteristic impedance that the ratio of power reflected to that transmitted in said common arm is in said given ratio, said source being connected to an arm of said first circulator preceding said common arm, said first load being connected to an arm of said first circulator succeeding said common arm, and said second load being connected to an arm of said second circulator succeeding said common arm.

6. The network according to claim 5 wherein a nonconductive gap is included between adjacent ends of said aligned conductors to introduce a serially associated capacity to said common arm.

7. The network according to claim 6 including a conductively isolated member of conductive material adjacent to said gap.

8. The network according to claim 6 wherein said gap is displaced away from the electrical center between said circulators along said aligned conductors.

9. The networks according to claim 5 wherein said aligned center conductors are conductively connected and including a grounded member of conductive material spaced from said connected center conductors and forming a capacitance to ground therewith.

10. The network according to claim 9 wherein said capacitance is displaced away from the electrical center between said circulators along said connected center conductors.

11. An electromagnetic wave system comprising a pair of signal sources, a pair of electromagnetic wave detectors, and a microwave network for dividing energy from each of said sources into substantially equal parts and for applying one of said equal parts from each source to each of said detectors, said network comprising first and second circulators each having at least three arms of given characteristic impedance and characterized by a successive circulation of power from an arm preceding a given arm to an arm succeeding a given arm, means for forming a common arm between said given arm of said first and said given arm of said second circulator, said common arm having an associated capacity of such value relative to said characteristic impedance that power reflected is equal to power transmitted in and by said common arm, said sources being connected each to an arm of respective ones of said circulators preceding said common arm, and said detectors being each connected to an arm of ones of said circulators succeeding said common arm.

12. The system according to claim 11 wherein said capacity is serially associated in said common arm.

13. The system according to claim 11 wherein said capacity is shunt associated in said common arm.

No references cited.

ROBERT L. GRIFFIN, Primary Examiner

R. S. BELL, Assistant Examiner

U.S. Cl. X.R.

332—43; 333—24.1